Feb. 25, 1969    S. C. HETH ET AL    3,429,109
GANG LAWNMOWER
Filed May 19, 1965    Sheet 1 of 6

Inventors
SHERMAN C. HETH
EVAN T. LEWIS
By Arthur J. Hansmann,
Attorney

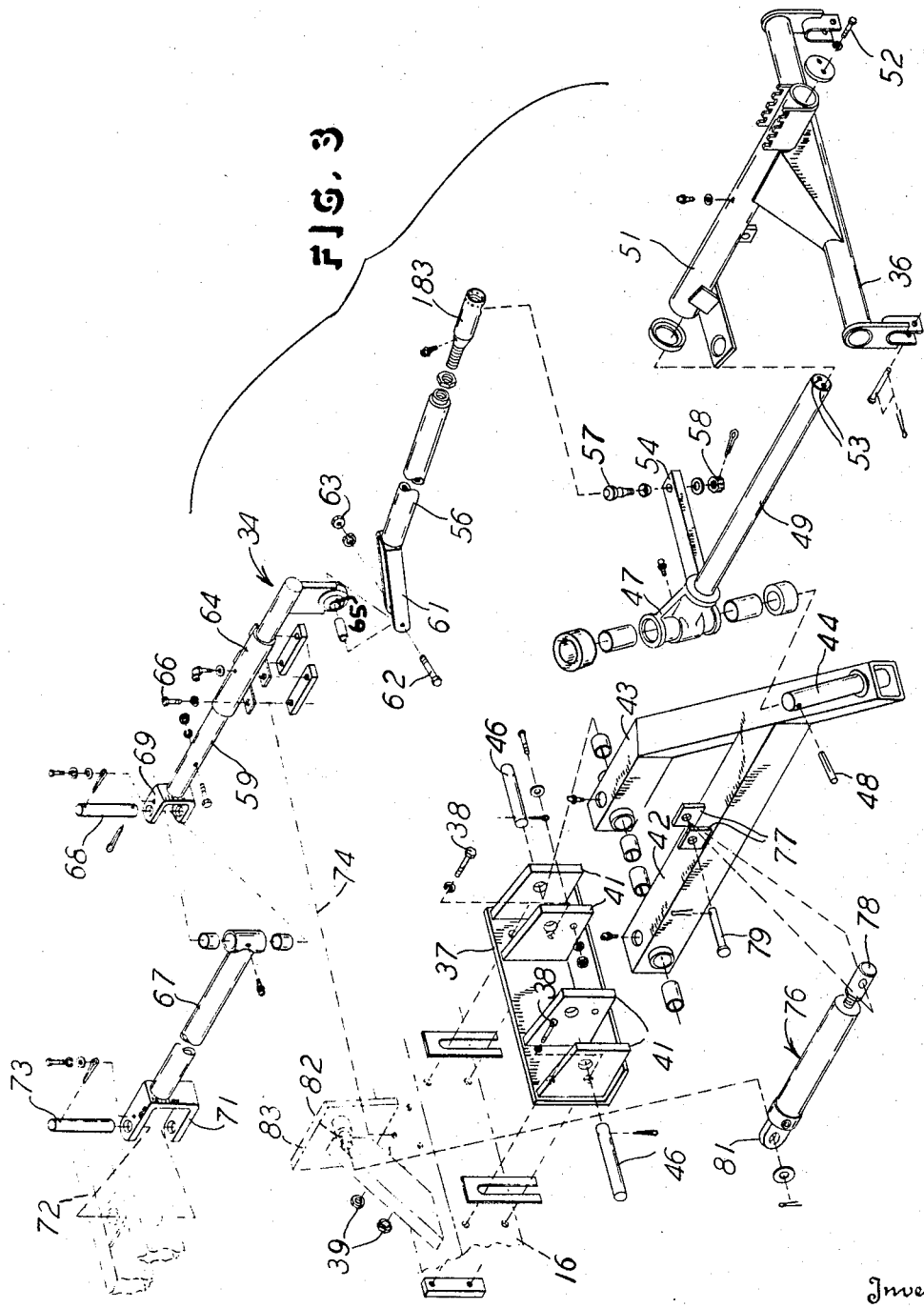

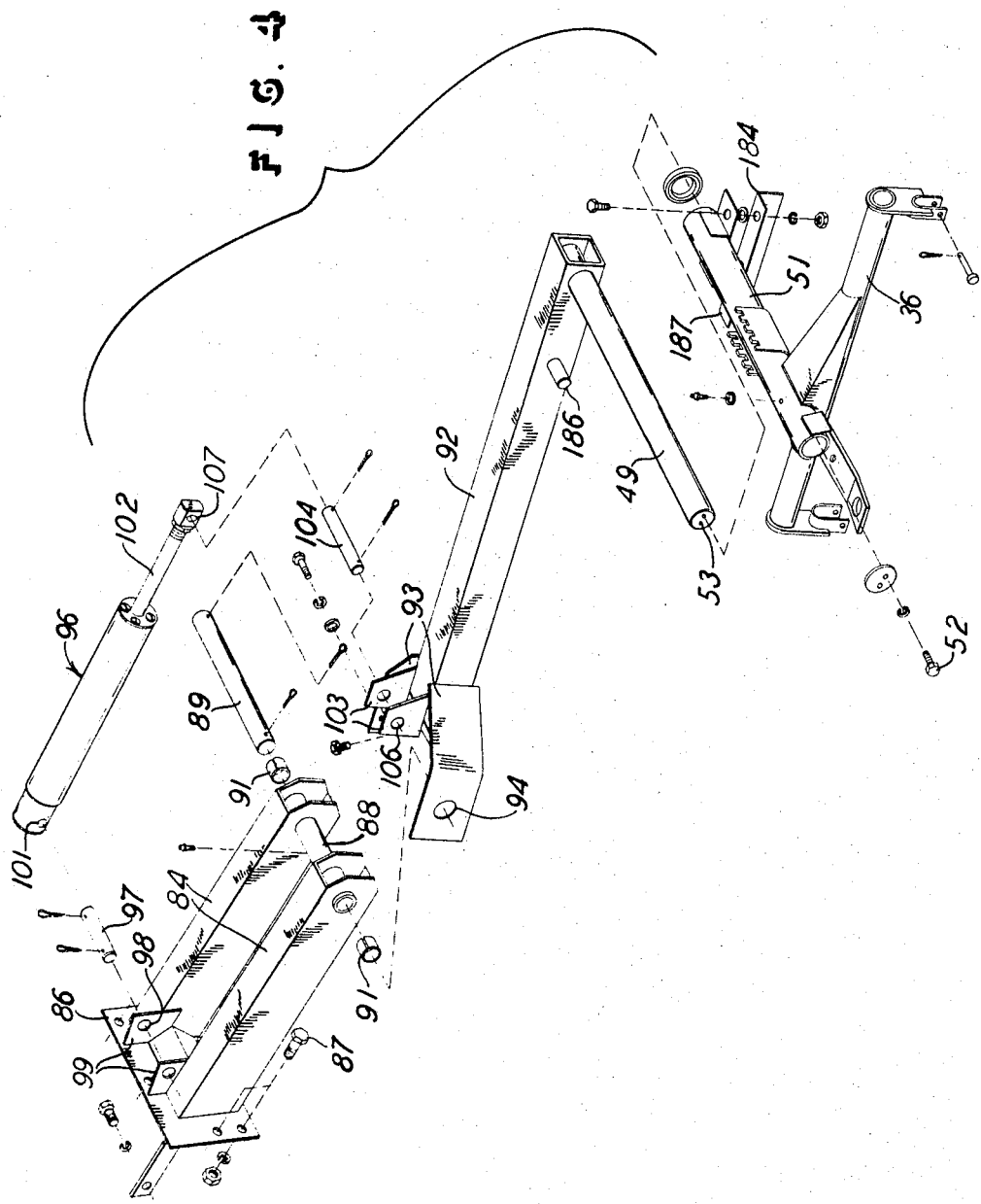

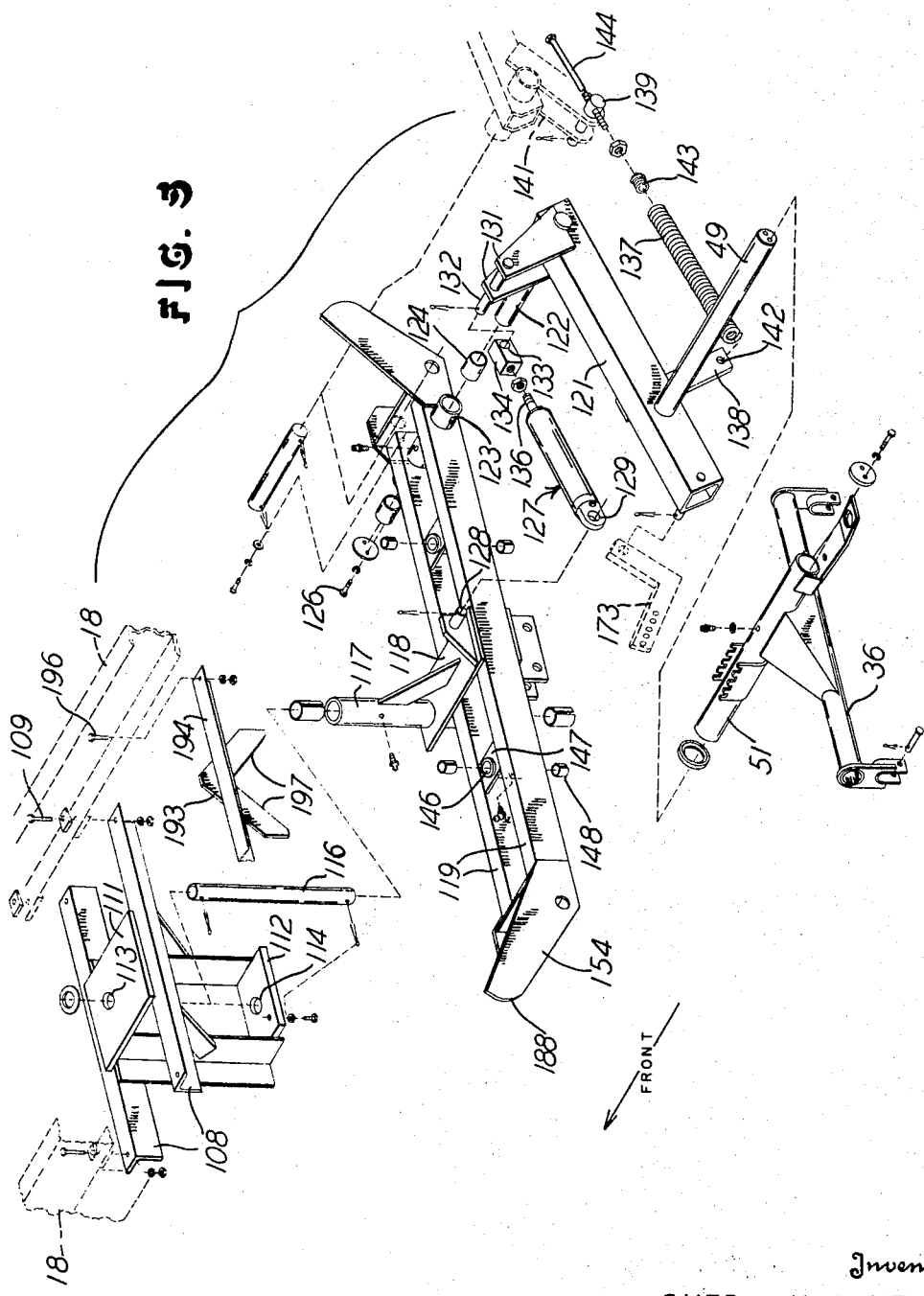

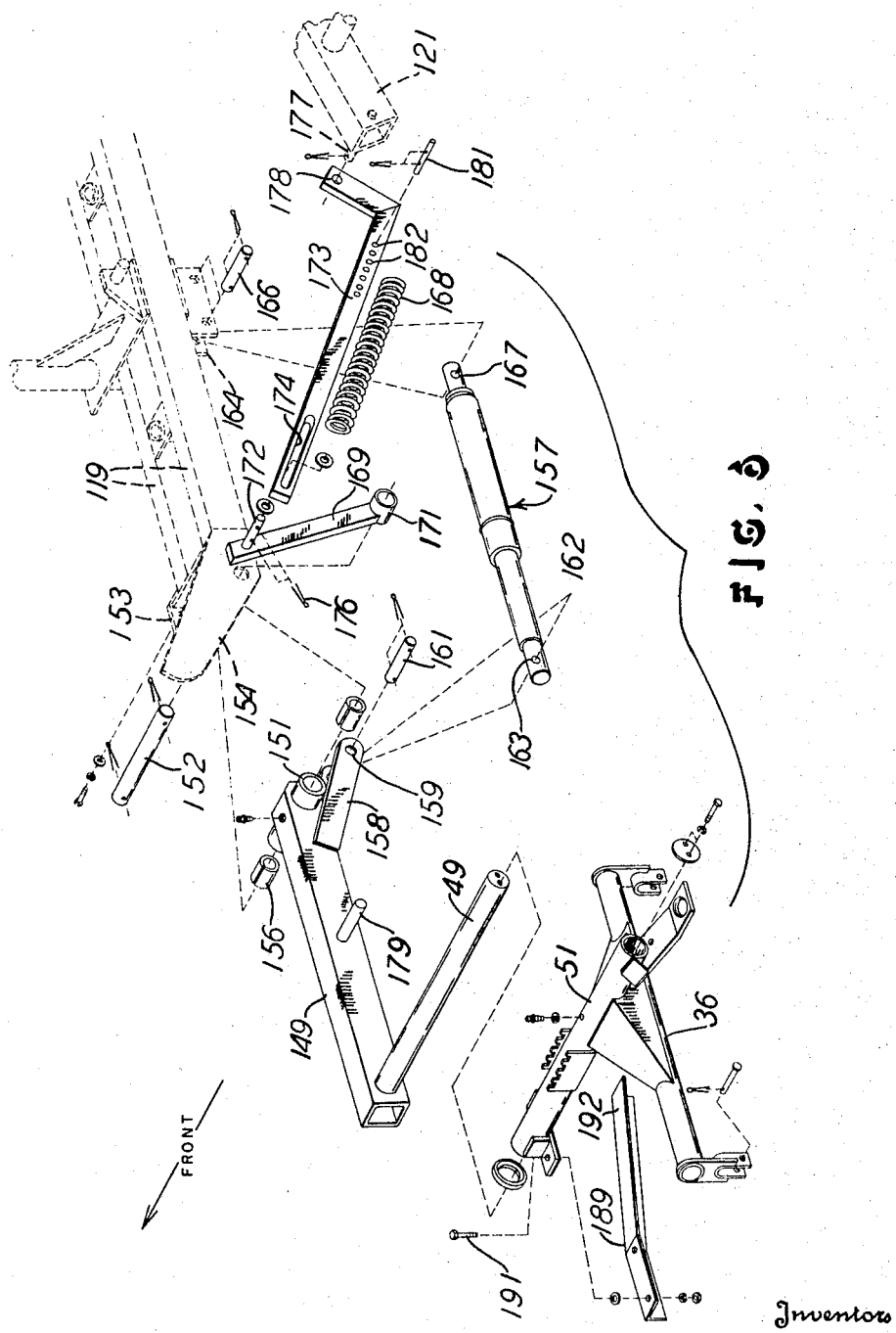

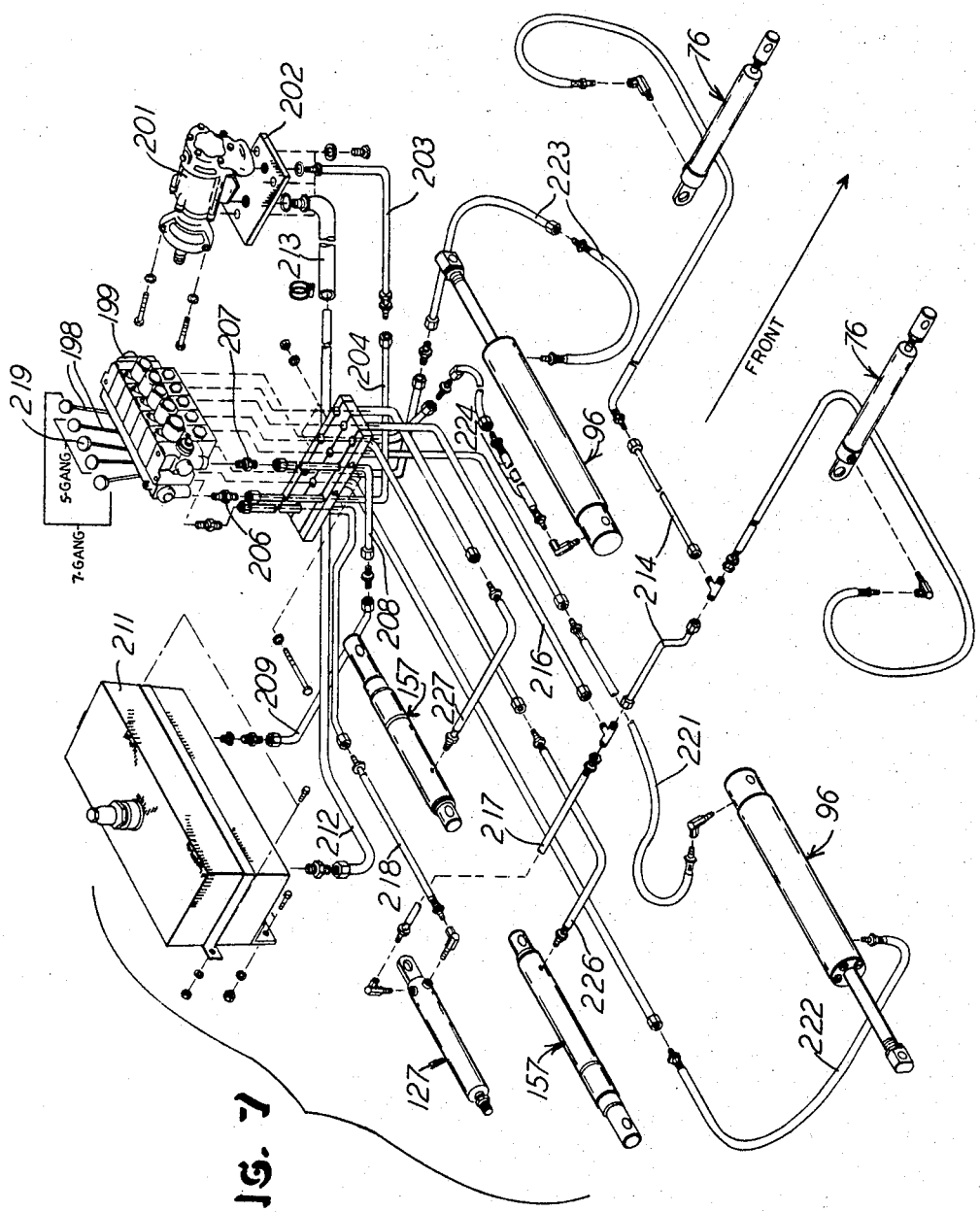

United States Patent Office 3,429,109
Patented Feb. 25, 1969

3,429,109
GANG LAWNMOWER
Sherman C. Heth and Evan T. Lewis, Racine, Wis., assignors to Jacobsen Manufacturing Company, Racine, Wis., a corporation of Wisconsin
Filed May 19, 1965, Ser. No. 456,979
U.S. Cl. 56—7     13 Claims
Int. Cl. A01d 75/30

ABSTRACT OF THE DISCLOSURE

A gang lawnmower having the plurality of mowers pivotally supported on a tractor with the pivot means providing for mower articulations so that the mowers can steer about the turning center of the tractor, the mowers can be raised to inoperative positions, and the mowers will pivot to follow the contour of the ground as well as pivot to a folded position when raised. Steering arms are provided between the mowers for steering and alignment of the mowers in the operative and inoperative positions, respectively.

---

This invention relates to a gang lawnmower.

Gang lawnmowers of the tractor-mounted type are in common use today. These mowers are pivotally mounted on the tractor, and they can be both raised off the ground, for the transport of the mowers, and they can be steered about the same center about which the tractor is steered. The present invention relates to tractor-mounted gang lawnmowers which are pivotally mounted on the tractor and which are steered with the tractor.

However, with respect to the heretofore known gang mowers, the mowers are not as completely versatile, functional, and easy to handle in both the mowing and transport positions, as are the mowers of the present invention. Thus the present invention is directed at a gang mower which supports the mowers on a tractor in a manner that the mowers can freely and completely follow the contour of the ground irrespective of the position of the tractor and the other mowers, and the mowers will also steer about the same axis of steering, or center of turning, of the tractor, and the mowers will also be raised to the compact transport position with respect to the tractor so that they do not occupy more than say an eight foot width so that they will pass through a normal garage or like doorway, and all of these features are accomplished in a single gang mower unit. Still further, the aforementioned is accomplished and each of the mowers of the gang are independently and separately mounted, and certain ones of the mowers can be raised, so that only the remaining certain ones will be in the mowing position when mowing on only one side or the other of the tractor is desired, or when mowing only along the width of the tractor is desired.

Still another object of the invention is to provide a gang mower with individual mowers which can be raised and which are automatically placed into a folded or compact position with respect to the mounting means of the mower on the tractor, all so that the assembly will not occupy more than a desired width of for instance eight feet.

A more specific object of this invention is to provide a gang mower with a tractor wherein different numbers of mowers can be readily mounted on the tractor for increasing the cutting width of the gang, for instance five or seven mowers can be so mounted on the tractor. Nevertheless, the individual mowers are power controlled from the tractor for raising and lowering the mowers from the mowing to the transport position, for instance, and for having only certain ones of the mowers lowered for mowing position for special mowing say, for instance, along a roadway but at a curb level while the tractor remains on the lower level of the road.

Still another object of this invention is to provide a gang lawnmower of the tractor type and wherein the tractor can be moved backward with the mowers in the ground-supported position without endangering the mowers and without other complications. This particular object is accomplished with a gang type mower which does have special steerable mowers of the type, such as exist in the prior art, which steer about the turning center of the tractor when the tractor is being turned or steered.

Still another object of this invention is to provide a gang type mower with a plurality of mowers mounted on a tractor and with each of said mowers being raised and lowered under the power of the tractor, but with the mowers all being supported directly on the tractor so that when one mower is raised it is not positioned to place its weight on any other mower.

Still a further object of this invention is to provide a gang type mower where the mowers are supported on and powered from a tractor and wherein the mowers are disposed to have one mower aligned in front of the tractor wheels so that the lawn can be mowed before the wheels depress the grass, but wherein these mowers can also be raised to the transport position and are disposed in a compact position with respect to the tractor so they will not occupy more than say an eight foot width, and wherein these raised mowers are held against free swinging when in the raised position. This particular object is accomplished with say for instance a seven gang mower which could have a fifteen foot cutting width, but which would have only an eight foot or less width in the transport position so that the entire unit could pass through an eight foot doorway.

Still a further object of this invention is to provide a mower of the tractor-mounted and gang type, as mentioned in the foregoing objects, and wherein the mowers and the tractor have the same or a common turning center, but with the turning radius from the side wheel of the tractor to the center of turning being only approximately eight-and-a-half feet for a seven gang mower having a fifteen foot cutting width.

Still a further object of this invention is to provide a gang mower such that the mowers are ground supported and driven and have the steerable or turning radius the same as that of the tractor in that both turn about the same center, and with the mowers being raisable to the transport position compact with the tractor.

Another object is to provide a gang lawnmower with mowers which steer with their tractor and which automatically align with the tractor when they are raised to the transport position.

Other objects and advantages of this invention include the provision of a gang mower for smooth mowing, readily and easily convertible to the transport position, very flexible in adjusting to the ground, very stable, ground visibility for the operator riding the tractor, easy to handle and steer the tractor with the mowers in either the mowing or the transport position, uncomplicated construction with minimum of parts for the function accomplished, uniformity in design of the cutting portions of the mowers themselves so that the mowers can be standardized or even interchanged except for the connection to the tractor at their respective locations, and other features which will become apparent upon reading the following description in light of the accompanying drawings, wherein:

FIG. 3 is an enlarged exploded view showing the front mower mounting and the steering arm, and with the tractor frame shown in dotted lines and with other dotted lines showing the manner of assembling the parts.

FIG. 4 is another exploded view showing the mounting for one of the mowers on the side of the tractor.

FIG. 5 is another exploded view showing the mounting for the center rear mower and the two rear side mowers.

FIG. 6 is another exploded view showing the remainder of the mounting for the one rear side mower.

FIG. 7 is another exploded view showing the hydraulic system for raising and lowering of the various mowers.

Figure 1:
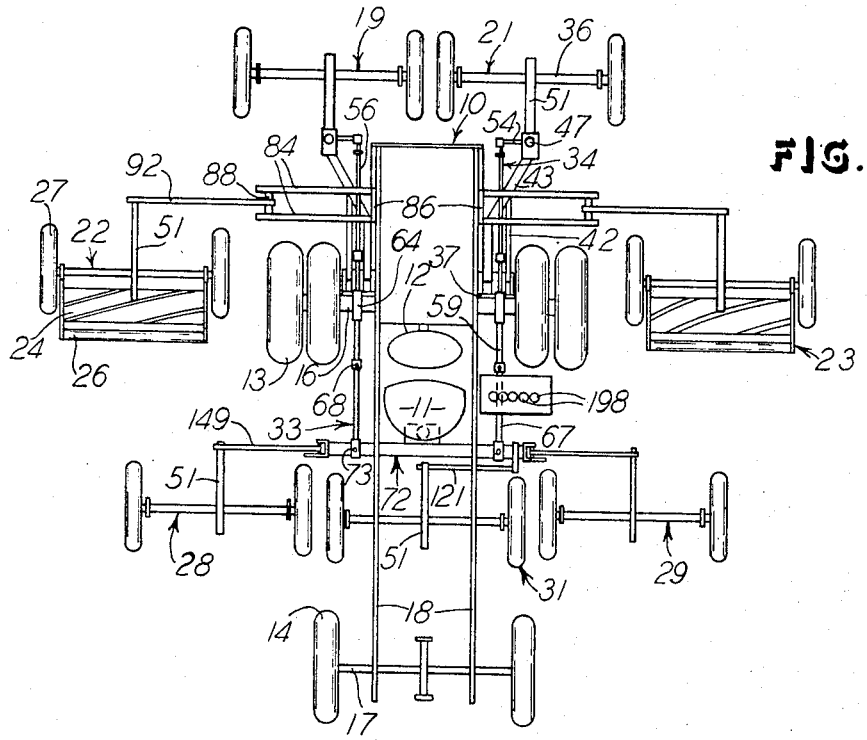
FIG. 1 is a top plan view diagrammatically showing a gang mower of this invention.
Figure 2:
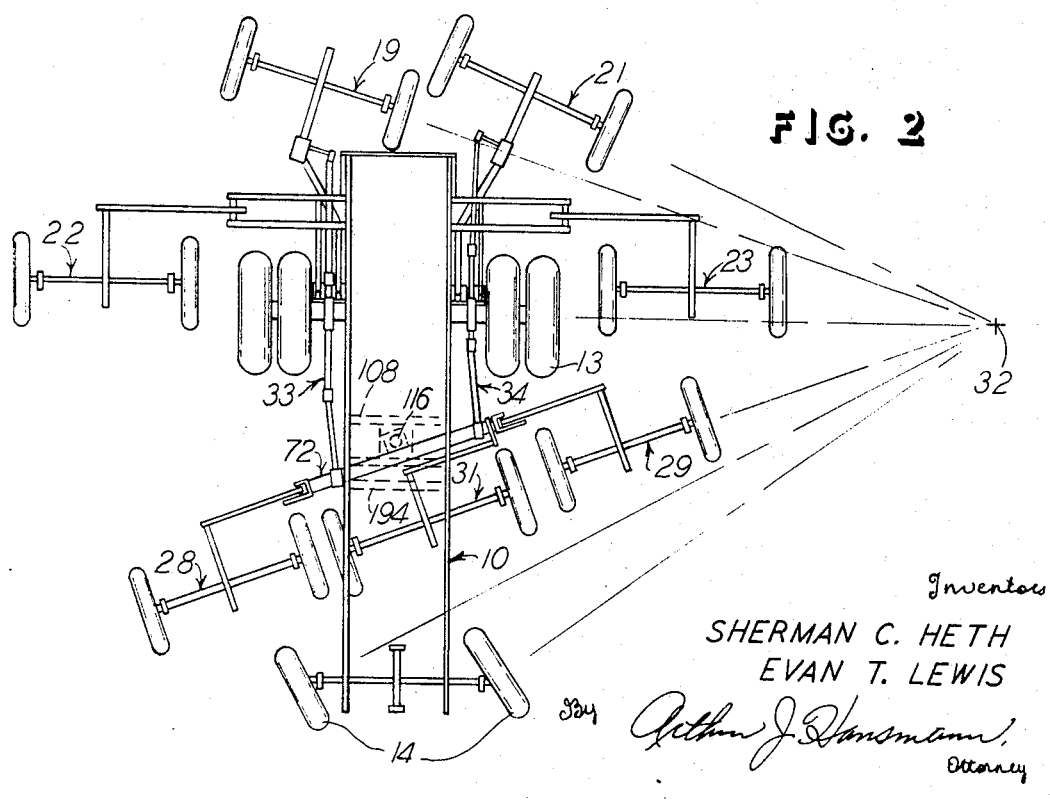
FIG. 2 is a top plan view showing the unit of FIG. 1 in the turning position, and with parts removed and other parts added in dotted lines.

FIGS. 1 and 2 indicate a tractor 10 which has an operator's seat 11 and a steering wheel 12 included therein. Also, front wheels 13 and steerable rear wheels 14 are mounted on the tractor front axle 16 and rear axle 17 respectively. The tractor also has side frame pieces 18 shown to extend the length of the tractor.

Two front mowers 19 and 21 are pivotally mounted on the tractor and extend therefrom directly in line with and ahead of the wheels 13 and 14 so that they mow the grass before the tractor depresses the grass. Two side mowers 22 and 23 are also pivotally mounted on the tractor, and these mowers are shown to have reels 24 and rear rollers 26, and they are termed outrigger mowers. Of course these mowers 22 and 23, like all of the mowers disclosed and described herein, are reel-type mowers having ground engaging wheels 27 which are disposed on the ground and when moved over the ground, the reels 24 are rotated in the well-known manner for cutting the grass. The mowers are therefore all of a conventional type of reel mower and need not be further disclosed or shown for one skilled in the art to understand this invention. Thus it will of course be understood that all of the mowers are of the reel-type as indicated with mowers 22 and 23.

Two other side mowers 28 and 29 are pivotally mounted on the tractor, and these mowers are wing mowers. Finally, a rear center mower 31 is also pivotally mounted on the tractor.

tI will therefore be seen that the gang mower includes the seven reel-type mowers indicated, and it will further be understood that any or all of the so-called side mowers, namely the mowers 22, 23, and 28, and 29, can be eliminated from the gang with a result that there remains either a five gang or three gang mower, according to the user's choice.

FIG. 2 shows the tractor 10 with the rear wheels 14 turned by means of the steering wheel 12 about the turning center designated 32. All of the seven mowers are also steered, or it may be said that they are turning about the center 32 also. Thus the entire unit will of course make a smooth turn, and such turn may be on an eight-and-a-half foot radius from the center 32 to the nearest tractor wheel 13. This short turning radius is accomplished though the seven gang mower provides a fifteen foot cutting width. It will of course be noted that the side mowers 22 and 23 have their wheels 27 on a plane forward of the tractor front axle 16. Nevertheless, the actual center of turning of the reels 22 and 23 is central with respect to the center of the wheels 27 and the center of the roller 26. This therefore places the mowers 22 and 23 on the same center or axis, for purposes of turning, as that of the tractor axle 16, actually of course this means that the mowers 22 and 23 have their turning center on the same vertical plane as the axis of the tractor front axle 16 is on.

FIGS. 1 and 2 also show that when the tractor 10 is turned, the rear center mower 31 turns with the tractor, as shown in FIG. 2. Control or steering rods 33 and 34 are mounted on the sides of the tractor 10 and connect between the rear mower unit and the front unit for mowers 19 and 21. Thus the turning of the tractor 10 as shown in FIG. 2 causes the steering rod 33 to move rearwardly and go back on the right side of the left front mower 19. The turning conversely causes the right steering arm 34 to move forward and push on the left side of the right front mower 21. Thus both mowers 19 and 21 align with the turning center 32 as shown.

FIG. 3 shows the details and mounting of both the right front mower 21 and the right-hand steering rod 34. While only a mower yoke 36 is shown to disclose the mower 21, it will be understood that the entire mower, which is including its conventional reel 24 and roller 26, would be included in the complete mower 21. The tractor front axle 16 is indicated by the dotted lines, and the parts for pivotally mounting the mower 21 to the tractor 10 are shown in solid lines. Also, the dotted lines extending between the parts, of course, indicate the location of the parts with respect to each other when the parts are assembled together as indicated in FIGS. 1 and 2.

A mounting bracket 37 is thus secured to the tractor axle 16 by bolts 38 and nuts 39. The bracket 37 has two pairs of plates 41 which pivotally support two arms 42 and 43 which are joined together at their forward ends and support an uprightly disposed pivot shaft 44. The arms 42 and 43 are vertically pivotally mounted on the tractor 10 through the plates 41 and by means of the pivot shafts 46 which extend through the plates 41 and through the arms 42 and 43 in the manner indicated.

A sleeve 47 is pivotally disposed over the shaft 44 and is secured thereto by means of the pin 48. Another pivot shaft 49 extends forwardly from the sleeve 47 and provides a pivot mounting for a sleeve 51 secured to the mower yoke 36. Bolts, such as the bolt 52, secure the sleeve 51 to the shaft 49 by threading into the bolt holes 53 in the end of the shaft 49. Thus it will be understood that the yoke 36, and therefore the entire mower 21, can pivot about the upright axis of the shaft 44 and also it can pivot about horizontal axis of the shaft 49. The mower 21 is thus fully articulate for conforming to the contour of the ground, by virtue of pivoting about the shaft 49, and for steering, as in the FIG. 2 showing, about the axis of the shaft 44.

The means for steering the mower 21 is the steering arm 34 which connects to an arm 54 affixed to the sleeve 47 and extending laterally thereof. Thus the front section 56 of the steering arm 34 is secured to the arm 54 by means of the stud 57 and nut 58. The stud 57 is shown to be a ball on its top, so it forms the pivot joint by being pivotal in the front end of arm assembly 34. The steering arm 34 has a central section 59 which is pivotally connected to the forward section 56, through the yoke 61 on the forward section 56 and the bolt 62 and nut 63, securing the sections 56 and 59 pivotally together. Also shown is a ball joint 65 disposed in section 59, and it permits the described lateral and vertical pivoting of section 56. Thus the front section 56 can pivot up and down, and laterally, with respect to the central section 59. Also, the section 59 is secured to the axle 16 by means of the sleeve 64 which is bolted to the axle by bolts, such as the shown bolt 66. The central section 59 can thus slide forwardly and rearwardly in the sleeve 64 for the steering action described in connection with FIG. 2.

The steering arm has a rear section 67 which is pivotally connected to the central section 59 through the vertical pin 68 and the yoke 69 on the rear end of the central section 59. Thus the rear section 67 can pivot horizontally with respect to the central section 59. The rear section 67 also has a yoke 71 which is secured to a mower mounting member 72, shown in dotted lines in FIG. 3, by means of a pin 73 extending between the pieces described. FIG. 5 shows the member 72 in solid lines, and its particular mounting will be descritbed more fully later. The dotted line designated 74 in FIG. 3 shows the location of the steering arm mounting sleeve 64 on the tractor axle 16.

Finally, FIG. 3 shows the means for power raising and lowering of the mower 21, and such means includes the hydraulic cylinder 76. Plates 77 on the mower pivot arm 42 pivotally attach to the ram 78 of the hydraulic cylinder unit 76 through the pin 79, as indicated. Also, the rear end of the cylinder unit 76 has a boss 81 which is pivotally mounted on the tractor 10 through a horizontally disposed pin 82 on the tractor plate 83 which is mounted on the tractor axle 16 in any suitable manner. Thus, extension and contraction of the hydraulic cylinder unit 76, in a manner and by means described later, will vertically pivot the mounting arms 42 and 43 to raise and lower the mower 21 as desired.

It will also be understood that an identical construction is employed for the left side steering arm 33 as well as for the mounting and power control of the left front mower 19, both as described in connection with the steering arm 34 and the fully articulate and pivotal mounting of the mower 21, respectively.

It will therefore be seen that the pivot means 49 and 51, for articulately mounting the mower to have its wheels 27 follow the contour of the ground, is centrally disposed on each of the mowers and is arranged to push the front mowers 19 and 21 while it tows the remaining five mowers shown in the seven gang mower of FIG. 1. Further, the entire sheet identified as FIG. 3 relates only to this one view, namely FIG. 3, and other parts shown on the sheet, though they had not been specifically mentioned, are of course obvious to one skilled in the art as to how they are assembled and utilized in the construction.

FIG. 4 shows the assembly and mounting for the right outrigger mower 23. Here again it will also be understood that the left outrigger mower 22 is constructed and mounted similar to the mower 23 but of course is reversed where necessary and apparent.

The mower yoke 36 is again provided for the outrigger mowers, and it is pivotally supported on the arm 49 and sleeve 51, with the latter affixed to the yoke 36, and with the yoke 36 of course being disposed above the ground-supporting and cutting elements of the mower as previously mentioned. Certain other parts are different between the two mowers, but these different parts are not directly involved in this disclosure except as mentioned hereinafter.

The two outrigger mowers are supported on the tractor by a pair of arms 84 affixed to the tractor side frames 18 by means of a plate 86 and the necessary bolts, such as the shown bolt 87, which secures the plate 86 directly to the side frames 18. The laterally extending ends of the arm 84 have a sleeve 88 affixed thereto, and the sleeve supports a shaft or pin 89, which extends beyond the ends of the sleeve 88 and thus beyond the arms 84 and the support bushings 91 in each end of the sleeve 88. Finally, an arm 92 has a bifurcation 93 with openings 94 for pivotally mounting the arm 92 on the pin 89. Thus the arm 92 can pivot up and down and carry the outrigged mower 23 up and down as desired.

To induce the pivotal motion under the power of the tractor, a hydraulic unit 96 is provided. The unit 96 is pivotally mounted to the tractor by means of the pin 97 extending through openings 98 in two spaced-apart plates 99 which are suitably secured to the side plate 86. Thus an opening 101 in the power unit 96 receives the pin 97 to have the end of the power unit 96 disposed between the plates 99, as indicated. The ram 102 of the power unit 96 is pivotally connected to two plates 103 secured to the pivot arm 92. A pin 104 is received in the openings 106 in the plates 103, and an opening 107 in the ram 102 receives the pin 104 to complete the connection and assembly indicated by the dotted lines in the exploded view in FIG. 4. Thus, by hydraulic lines and power means shown and to be described later in connection with FIG. 7, the outrigger units can be raised and lowered under the control of the operator.

FIG. 5 shows the mounting of the rear center mower 31, and here it will be noted that the tractor side frame pieces 18 support angle cross pieces 108 which are secured as a part of the tractor frame by means of the bolts 109. The pieces 108 support upper and lower plates 111 and 112 which have openings 113 and 114 respectively. Of course the plates 111 and 112 are thus fixed as a part of the tractor frame for supporting the rear unit as hereinafter described.

A pivot pin 116 is received in the openings 113 and 114 to be vertically disposed on the tractor and to support a sleeve 117. Plates, such as the plate 118, are fixed to the sleeve 117 and in turn support cross pieces 119 which are thus also pivotal on the pin 116, such as indicated in FIG. 2.

The assembly described to this point in connection with FIG. 5 provides the pivotal steering arrangement for the front and rear mowers of the five units shown in FIG. 2 on a seven gang mower. The cross pieces 119 are actually pivoted about pin 116 in response to the tracking function of the rear center mower 31. This mower, along with the wing mowers 28 and 29, when they are lowered, provide the steering of the front and rear mowers as mentioned.

The sheet of drawings, FIG. 5, also bears a designation "FRONT," and this of course indicates the direction of forward movement of the mower. Thus it will be seen that the mower yoke 36 and tube 51 and pivot shaft 49, all for the rear center mower 31, are in a trailing position with respect to the parts described in FIG. 5. The shaft 49 is mounted on a pivot arm 121 which has a pivot pin 122 received in a sleeve 123 on the end of the cross pieces 119. The usual and conventional bushings 124 are also shown, and the shaft 122 is secured in the assembly by means of the screw 126 which would go into a threaded opening in the far and unshown end of the pin 122, just as described in connection with the pivot shaft 49.

Thus the arm 121 can pivot up and down with respect to the cross pieces 119, and this carries the shaft 49 and thus the entire mower 31 up and down under a power means described hereinafter.

A power unit 127 is pivoted on a pin 128 secured to the cross pieces 119 as shown. An opening 129 in the power unit 127 receives the pin 128 to mount the unit 127 on the cross pieces 119. The arm 121 has upstanding plates 131 which carry a pin 132 which in turn is received in an opening 133 on the block 134 which is secured to the ram 136 on the unit 127. Thus extension and contraction of the unit 127 will displace the pin 132 and thus cause the arm 121 to pivot about its pin 122 and raise and lower the mower 31 as desired.

In order to maintain adequate ground pressure of the mower 31 for the tracking and steering function, particularly when the wing units 28 and 29 are raised, a pressure means including a tension spring 137 is connected between an arm 138 affixed to the pivot arm 121 and a pin 139 which is attached to plates 141 which form an attachment to the mounting for the right wing unit 29. Thus the lower end of the spring 137 connects to the plate 138 by hooking into the hole 142 in the plate 138. A plug 143 is attached to the upper end of the spring 137, and an adjusting screw 144 passes into the spring 137 and the plug 143, and the bolt 144 threads with the plug 143 to connect to the spring, and the bolt is slidable in the pin 139. Thus, when the right wing unit 29 is raised, in a manner hereinafter described and by means hereinafter described, then the spring 137 pulls downwardly on the arm 138 and thus on the arm 121 to give ground pressure to the rear center mower 31. The bolt 144 provides adjustment for this ground pressure for tracking by the center mower 31 when either or both of the wing mowers 28 and 29 are raised, and thus the rear center mower 31 and the front mowers 19 and 21 can be steered as desired. It will therefore be understood that the unthreaded and upper end of the bolt 144 slides through the opening in which it is shown to be received in the pin 139 for both the floating movement of the mower 31 and its arm 121 in normal mowing and for the pressurizing and adjusting of the center mower 31 as just described.

With reference to FIGS. 3 and 5 and the attachment of the steering arms 34 and 33, it will now be noted that the cross piece designated 72 in FIG. 3 is described as the two cross pieces 119 in FIG. 5 in more detail. Also, the steering arm pins 73 are received in openings 146 on plates 147 extending between the pieces 119 in FIG. 5. Bushings 148 are also employed around the opposite ends of the pins 73 for the necessary freedom of movement of the steering arms and for wear purposes.

FIG. 6 shows the mounting for the left wing unit 28, and here it will be noted that the yoke 36 and its sleeve 51 and the pivot shaft 49 are again employed. The mower 28 is thus pivotally supported on the tractor by means of the pivot arm 149 which supports the pivot shaft 49. The arm 149 has a sleeve 151 which is pivotally mounted on a pin 152 secured to plates 153 and 154 on the ends of pieces 119. Bushings 156 are also disposed on the pin 152 for the rotatable support of the sleeve 151. Thus the arm 149 will pivot up and down under a power means of the hydraulic unit 157. This unit is connected to a plate 158 attached to the arm 149 and having an opening 159 which receives a pin 161 which in turn pivotally connects to the ram 162 through the opening 163. Plates 164, extending below the cross pieces 119 and attached thereto, support a pin 166 which extends through an opening 167 in the other end of the unit 157 to mount the latter on the cross pieces 119. Thus extension and contraction of the unit 157, under a hydraulic system hereinafter described, forces on the plate 158 to correspondingly pivot the arm 149 as desired.

On this side of the unit it is again desirable to maintain a pressure on the rear center unit 31 when the left wing unit 28 is raised. To accomplish this, a compression spring 168 is employed between the left wing unit and the center unit 31. Thus an arm 169 is supported on the pin 152 through a sleeve 171 on the lower end of the arm 169. A pin 172 on the upper end of the arm 169 engages an L-shaped arm 173 in a slot 174 in the arm 173. Thus the pin 172 can slide back and forth in the slot 174, and is secured thereto by means of a cotter pin 176 passing through the shown openings in the pin 172 so that a cotter pin 176 is on each side of the arm 173 when the latter is mounted on the pin 172 as described. Spring 168 is telescoped on arm 173.

The lower end of the arm 173 connects to the center unit's pivot arm 121 by means of a pin 177 extending from the side of the arm 121 and engaging an opening 178 in the arm 173.

Thus when the left wing unit 28 is raised by the lift or power unit 157, the spring 168 is compressed to put the pressure on the arm 121 by means of a pin 179, on the arm 149, engaging the upper end of the arm 169, adjacent say the pin 172, and thus displacing the arm 169 and its pin 172 against the upper end of the spring 168. The lower end of the spring 168 is secured to the arm 173 by a pin 181 which passes through one of a plurality of openings 182 in the arm 173. Thus the spring 168 is compressed and forces downwardly on the arm 173 and thus on the arm 121, as described. It will also be understood that the amount of pressure is adjustable by means of moving the pin 181 into a selected one of the holes 182. In this manner, a desired amount of pressure can be applied on the rear mower 31 so that its pressure is not so great as to leave undesirable tracks, but is still great enough to cause the tracking for steering of the unit 31 and thus of the front units 19 and 21. It is therefore to be understood that the spring 168 is telescoped with the arm 173 so that the pin 172 can slide in the slot 174 and compress the spring 168 against the pin 181 as described.

Of course there is only the spring 137 on the right hand side of the assembly, that is there is none on the left hand side, and there is only the spring 168 on the left hand side and none on on the right hand side. This is true since the two springs are arranged to both urge the arm 121 downwardly, and they are of course located on the opposite sides and thus the spring 137 is a tension spring and the spring 168 is a compression spring.

When all of the seven mower units are raised, it is desired that they be held against any movement or swinging which would damage the mower or which would even cause them to exceed the desired say eight foot width for passing through a doorway. Thus each of the mowers has a means for holding it secure in the raised or transport position. The steering arms 33 and 34 actually secure the front mowers against movement to where they would turn sideways and exceed the desired maximum width in the transport position. This is accomplished by having the center of pivot of the forward section 56 of the steering arm disposed slightly forward and above the center of pivot of the front mower's supporting arms 42 and 43. Thus when the front mowers are raised by pivoting their arms 42 and 43 upwardly, the steering arm sections 56 hold the mowers against swinging movement which would cause them to exceed a desired maximum width or space lateral of the assembly. This therefore places the steering arm pivot bolts 62 slightly forward and slightly above the pivot pins 46, as shown in FIG. 3 in connection with these parts. This will be understood by realizing that when the front mower units are raised, they are free to pivot about their mounting pivot pins 44 in the so-called steering direction, but the steering arm section 56 will restrain them from the pivotal motion mentioned. This is true since the pin 44 and the attachment arm 54 are on the same forward plane while their control points or axes are at different points on the pins 46 and bolts 62 respectively. Thus the arms 42 and 43, and the steering section 56, are pivoting on different centers and will scribe different arcs at their respective forward points to hold the forward mowers.

At this time it will also be noted that the section 56 has an adjustable forward end 183 which is threaded into the central portion of the section 56, and this permits alignment of the front mowers 19 and 21 across the front of the units. Such alignment is desirable for good cutting as well as steering of the units.

The outrigger units 22 and 23 are folded inwardly, when they are raised to the transport position, by means shown in FIG. 4. An angle plate 184 is attached underneath the tube 51 and affixed thereto, and when the arm 92 is raised it carries a pin 186 which engages the end 187 of the angle piece 184 to rotate the sleeve 51 and thus fold the entire mower 23 in its raised position. A similar means is of course also applied for the mower 22. This means and function will of course be understood when it is recognized that the arm 92 approaches an upright position in the transport position.

FIGS. 5 and 6 show how the rear wing units are folded or made compact with the tractor when in the transport position. Here it will be noted that the plates 154 have camming surfaces 188 on the outer edges thereof. When the wing units are raised, the camming surfaces 188 engage an angle piece 189 which is affixed to the sleeves 51 by means of bolts, such as the shown bolt 191. Thus the plate surfaces 192 engages the cam surfaces 188, on each side of the tractor, as the arms 149 are pivoted upwardly. This of course causes the units 28 and 29 to pivot or rotate about their mounting shafts 49 and thus fold or become compact with the tractor.

It will therefore be understood that in the transport position both the outrigger units and both of the wing units are disposed with their respective wheels one above the other rather than in the normal horizontal position of mowing. This therefore occupies less lateral space by each of the units and it is in this manner that they are compact with the tractor, and such will therefore be understood. The rear center unit 31 is also held against swinging movement in transport by means of a V-shaped guide 193 as shown in FIG. 5. This guide is secured, by welding or the like, to a cross piece 194 which is indicated to be bolted to the tractor side frames 18 by means of bolts, such as the shown bolt 196. Thus the under surface 197 of the guide 193 engages the sleeve 51 when the rear center unit is raised and thus retards the sleeve 51 from rotating and permitting the mower 31 to swing or tip in the transport position.

An important feature of the guide 193 is that when the rear center mower is raised from a turned or steered position, the guide surface 197 engages the tube 51 to turn rear center mower 31 back into alignment of the FIG. 1 position. This therefore of course brings the front mowers 19 and 21 into alignment also, and thus the mowers are disposed in the raised position so that they do not exceed say an eight foot width. Of course this function of the guide 193 is actually causing the entire cross frame 72 to pivot about its pin 116 so that the entire three rear mowers come into aligned or straightforward position if they had been in the turned position when the raising was commenced.

FIGS. 1 and 7 show hydraulic control levers 198 mounted adjacent the operator's seat 11. These levers extend to hydraulic valves 199 which control the flow of hydraulic fluid to the raising and lowering power units previously described. A hydraulic pump 201 is suitably mounted on the tractor, by the mounting plate 202 and the other means of bolts and the like shown. The hydraulic hose 203 and a hydraulic tube 204 connect together by means indicated and extend from the pump 201 to a connector 206 which connects to one side of the valve assembly 199. The other side of the valve 199 has a connector 207 which connects to a hydraulic tube 208 which in turn connects to a tube 209 connected to a hydaulic reservoir 211. Still another hydraulic tube 212 connects to the reservoir 211 and to a hydraulic hose 213 connected to the pump 201.

In the aforementioned manner, the pump 201 supplies hydraulic fluid to the valve housing 199 for fluid pressurizing the power unit shown therein.

The power units 76 for lifting the two front mowers are shown to be single acting units with hydraulic connections or tubes 214 which connect with a hydraulic tube 216 extending into the valve housing 199. The line 216 also connects to a line 217 which extends to the rear center power unit 127, and this is a double acting unit having a second line 218 connected to the unit 127 and extending to the valve housing 199. Thus it will be understood that the two front units 76 and the rear center unit 127 operate together since it would be desired that these are all either raised or lowered together. These units are thus shown to be controlled off the central valve control or lever 219 of the shown five levers 198, and these five are shown to be useful in the seven gang mower.

The two outrigger power units 96 are shown to be double acting units with connections 221 and 222 on the near unit 96 in FIG. 7, and with connections 223 and 224 on the far unit in FIG. 7. These two units would be employed in the seven gang mower, and thus the two outside ones of the shown five levers 199 would be used in controlling these units through the lines or connections described.

Finally, the power unit 157 for operating the rear wing mowers is shown to each have hydraulic lines 226 and 227 respectively connected to these units 157. Thus FIG. 7 discloses the various hydraulic hoses, tubes, and connectors, and their respective locations and connections with the power units and with the valve housing 199. In this manner, it will be seen that the operator has complete control of each of the units, and any of the units can be raised and lowered separately, except for the two front mowers and the rear center mower which are worked together as desired. Also, these mowers can be placed at any elevation, that is the outrigger and wing mowers can be so placed at for instance a curb elevation while the tractor remains at a street level. With the construction shown and described, the unit will mow smoothly even at the elevation other than what the tractor is on.

While the specific embodiment and method of this invention have been shown and described, it should be obvious that changes could be made therein, and the invention should be determined by the scope of the appended claims.

What is claimed is:

1. A gang lawnmower comprising a powered tractor, a plurality of lawnmowers, first pivot means separately and independently pivotally mounting said mowers on said tractor and about which there may be separate raising and lowering of said mowers with respect to said tractor and with some of said mowers disposed to the front of said tractor and with the other of said mowers disposed rearwardly of said front mowers, additional pivot means operatively connected between said mowers and said tractor and about which there may be steering of said mowers in response to the steering of said tractor, steering means connected between said front mowers and the other of said mowers for steering said mowers together as a unit, said steering means being articulated with respect to each of said mowers and in both the horizontal and the vertical planes for both the steering and the vertical movement of said mowers, respectively, and guide means connected to said tractor and engageable with said mowers for aligning said mowers with respect to the fore-and-aft axis of said tractor and securing said mowers so aligned when they are raised on said tractor.

2. A gang lawnmower, comprising a steerable and powered tractor including ground wheels, at least five lawnmowers, at least two of said mowers disposed ahead of said tractor as front mowers, a pivot means separately and independently pivotally mounting said two front mowers on said tractor and about which there may be raising and lowering of said two front mowers with respect to said tractor, a carrier pivotally connected to said tractor about a vertical pivot axis rearward of said two front mowers and steerable with said tractor, at least three of said mowers mounted on said carrier in side-by-side relation, pivot means connected to said three mowers and about which there may be raising and lowering of said three mowers with respect to each other and said tractor, additional pivot means connected between said two front mowers and said tractor and about which there may be steering of said two front mowers around said center of turning of said tractor, steering means connected between said two front mowers and said carrier for transmitting the steering pivot of said carrier to said two front mowers, power lift means on said tractor and connected to said mowers for raising and lowering said mowers, force-applying means operatively connected between the center one and the side ones of said mowers on said carrier for forcing downwardly on said center mower in response to raising said side mowers and to thereby give sufficient ground force with said center mower to steer said mowers, and adjustment means included in said force-applying means for controlling the ground force of said center mower.

3. A gang lawnmower, comprising a steerable and powered tractor including ground wheels, at least five lawnmowers, at least two of said mowers disposed ahead of said tractor, pivot means separately and independently pivotally mounting said two mowers on said tractor and about which there may be raising and lowering of said two mowers with respect to said tractor, a carrier pivotally connected to said tractor about a vertical pivot axis rearward of said two mowers and steerable with said tractor, at least three of said mowers separately and independently mounted on said carrier in side-by-side relation, pivot means connected to said three mowers for articulation and thereby separate and independent raising and lowering of said three mowers with respect to said tractor, additional pivot means connected between said two mowers and said tractor for articulation and thereby steering said two mowers about said center of turning of said tractor, steering means connected between said two mowers and said carrier for transmitting the steering pivot of said carrier to said two mowers, power lift means on said tractor and connected to said mowers for raising and lowering said mowers, and guide means operative between said tractor and the center one of said rear mowers when the latter is raised and thereby have said carrier, and consequently said two mowers, aligned with respect to the fore-and-aft axis of said tractor and thereby secure all said mowers so aligned when they are all raised.

4. A gang lawnmower, comprising a powered tractor including ground wheels, at least five lawn mowers, at least five first pivot means with one for each of said mowers and separately and independently pivotally mounting each of said mowers on said tractor and about which there may be raising and lowering of each of said mowers with respect to said tractor and with each of said mowers being separately pivotally supported on said tractor to be free of interconnection with the others for mounting support on said tractor, at least two of said mowers being disposed ahead of said tractor in fore-and-aft alignment with said ground wheels and with at least two other of said mowers being disposed to the sides of said tractor, second pivot means on each of said mowers and having the pivot axis parallel to the fore-and-aft axis of said tractor for articulation of said mowers with respect to both said pivot means to have said mowers follow the contour of the ground.

5. A gang lawnmower, comprising a steerable and powered tractor including ground wheels, at least five lawnmowers, at least five first pivot means with one for each of said mowers and separately and independently pivotally mounting each of said mowers on said tractor and about which there may be raising and lowering of each of said mowers with respect to said tractor and with which each of said mowers is separately pivotally supported on said tractor to be free of dependence on each other for mounting support, at least two of said mowers being disposed ahead of said tractor in fore-and-aft alignment with said ground wheels and with at least two other of said mowers being disposed to the sides of said tractor in alignment with the axes of said ground wheels for steering of said mowers about the center of turning of said tractor, second pivot means on each of said mowers and having the pivot axis parallel to the fore-and-aft axis of said tractor for articulation of said mowers with respect to both said pivot means to have said mowers follow the contour of the ground, and third pivot means connecting the remainder of said mowers other than said side mowers to said tractor for articulation and thereby steering said remainder of said mowers about said center of turning.

6. A gang lawnmower, comprising a powered tractor, at least three lawnmowers, at least three first pivot means with one for each of said mowers and separately and independently pivotally mounting each of said mowers on said tractor and about which there may be separate raising and lowering of each of said mowers with respect to said tractor and with each of said mowers being separately pivotally mounted on said tractor to be free of dependence on each other, at least two of said mowers being disposed to the front of said tractor and other of said mowers being disposed rearwardly of said two front mowers, second pivot means on each of said mowers and having the pivot axis parallel to the fore-and-aft axis of said tractor for articulation of said mowers with respect to both said pivot means to have said mowers follow the contour of the ground, third pivot means operatively connected between said mowers and said tractor for articulation and thereby steering of said mowers in response to the steering of said tractor, and steering means connected between said two front mowers and the other of said mowers for steering said mowers together as a unit.

7. A gang lawnmower comprising a powered tractor, a plurality of lawnmowers, an equal plurality of first pivot means with one for each of said mowers and separately and independently pivotally mounting each of said mowers on said tractor and about which there may be separate raising and lowering of each of said mowers with respect to said tractor and with each of said mowers being separately pivotally mounted on said tractor to be free of dependence on each other for mounting support, some of said mowers being disposed to the front of said tractor and other of said mowers being disposed rearwardly of said front mowers, additional pivot means operatively connected between said mowers and said tractor for articulation and thereby steering of said mowers in response to the steering of said tractor, and steering means connected between said front mowers and the other of said mowers for steering said mowers together as a unit, said steering means being articulated with respect to each of said mowers and in both the horizontal and the vertical planes for both the steering and the vertical movement of said mowers respectively.

8. A gang lawnmower comprising a powered tractor, a plurality of lawnmowers, first pivot means separately and independently pivotally mounting said mowers on said tractor about which there may be separate raising and lowering of each of said mowers with respect to said tractor and with some of said mowers disposed to the front of said tractor and with the other of said mowers disposed rearwardly of said front mowers, additional pivot means operatively connected between said mowers and said tractor for articulation and thereby steering of said mowers in response to the steering of said tractor, and steering means connected between said front mowers and the other of said mowers for steering said mowers together as a unit, said steering means being articulated with respect to each of said mowers and in both the horizontal and the vertical planes for both the steering and the vertical movement of said mowers, respectively, the location of the pivot axis of said front mowers being rearwardly and below the location of the pivot axis of the articulation of said steering means for said front mowers, with respect to said tractor fore-and-aft axis, and with said pivot axes being spaced apart in relative positions to cause said front mowers to align relative to the fore-and-aft axis of said tractor and to hold said front mowers from turning out of forward alignment when they are raised to the transport position.

9. A gang lawnmower, comprising a steerable and powered tractor, including ground wheels, at least five lawnmowers, a first pivot means for each of said mowers and separately and independently pivotally mounting said mowers on said tractor and about which there may be raising and lowering of each of said mowers with respect to said tractor and with each of said mowers being separately pivotally supported on said tractor to be free of dependence on each other for mounting support, at least two of said mowers being disposed ahead of said tractor in fore-and-aft alignment with said ground wheels and with at least two other of said mowers being disposed to the sides of said tractor in alignment with the axes of said ground wheels for steering of said mowers about the center of turning of said tractor, second pivot means on each of said mowers and having the pivot axis parallel to the fore-and-aft axis of said tractor for articulation of said mowers with respect to both said pivot means to have said mowers follow the contour of the ground, third pivot means connecting the remainder of said mowers other than said side mowers to said tractor for articulation and thereby steering said remainder of said mowers about the center of turning, steering means extending between said front mowers and a rearward one of said mowers, and force-applying means connected between said rearward one of said mowers and other of said mowers for urging said one of said mowers downwardly onto the ground so it will track and steer with the steering of said tractor, when said other of said mowers is raised off the ground.

10. A gang lawnmower comprising a steerable and powered tractor, a plurality of lawnmowers, first pivot means separately and independently pivotally mounting said mowers on said tractor and about which there may be raising and lowering of said mowers with respect to said tractor and with at least two of said mowers disposed ahead of said tractor and with at least two other of said mowers disposed rearwardly, additional pivot means connecting said mowers to said tractor for articulation and thereby steering said mowers about the center of turning of said tractor, steering means extending between said front mowers and said rearward mowers, and force-applying means connected between said rearward mowers for urging one thereof downwardly onto the ground upon raising of another thereof so said one mower will track and steer with the steering of said tractor.

11. A gang lawnmower, comprising a steerable and powered tractor including ground wheels, at least five lawnmowers, at least two of said mowers disposed ahead of said tractor, pivot means separately and independently pivotally mounting said two mowers on said tractor and about which there may be raising and lowering of said two mowers with respect to said tractor, a carrier pivotally connected to said tractor about a vertical pivot axis rearward of said two mowers and steerable with said tractor, at least three of said mowers mounted on said carrier in side-by-side relation, pivot means connected to said three mowers for articulation and thereby raising and lowering of said three mowers with respect to said tractor, additional pivot means connected between said two mowers and said tractor for articulation and thereby steering said two mowers about said center of turning of said tractor, steering means connected between said two mowers and said carrier for transmitting the steering pivot of said carrier to said two mowers, power lift means on said tractor and connected to said mowers for raising and lowering said mowers, and force-applying means operatively connected between the center one and the side ones of said mowers on said carrier for forcing downwardly on said center mower when said side mowers are raised and to thereby give sufficient ground contact with said center mower to steer said mowers.

12. A gang lawnmower, comprising a powered tractor including ground wheels, at least five lawnmowers, a first pivot means for each of said mowers and separately and independently pivotally mounting said mowers on said tractor for articulation and thereby raising and lowering said mowers with respect to said tractor and with said mowers being separately and fully supported on said tractor in the raised position to be free of dependence on each other for mounting support, at least two of said mowers being disposed ahead of said tractor in fore-and-aft alignment with said ground wheels and with at least two other of said mowers being disposed to the sides of said tractor, second pivot means on each of said mowers and having the pivot axis parallel to the fore-and-aft axis of said tractor for articulation of said mowers with respect to both said pivot means to have said mowers follow the contour of the ground, means connected to said mowers for raising and lowering said mowers, and means spaced above and engagable with at least some of said mowers only upon raising the latter said mowers to a minimum elevation into contact with the latter said means for pivoting said some of said mowers about said second pivot means to dispose them in horizontally oblique positions and thereby compact with said tractor.

13. A gang lawnmower convertible between a three-gang unit and a five-gang unit and a seven-gang unit, comprising a steerable and powered tractor including front ground wheels, a plurality of three to seven ground-riding lawnmowers, a like plurality of first pivot means operatively connected between said tractor and each of said mowers to have the latter separately and independently pivotally mounted on said tractor for articulation and thereby raising and lowering said mowers with respect to said tractor, and with said mowers being separately supported on said tractor to be free of interconnection between each other for mounting support, second pivot means on each of said mowers and having the pivot axis of said second pivot means disposed parallel to fore-and-aft axis of said tractor for articulation of said mowers with respect to both said pivot means to have said movers follow the contour of the ground, third pivot means connecting at least some of said mowers to said tractor for steering said mowers in the directions of steering said tractor to provide a common turning center for said tractor and said mowers, said mowers being disposed with two thereof forward of said front wheels and one mower rearward of said front wheels in said three-gang unit, and with one thereof on each side of said rearward mower in said five-gang unit, and with one thereof on each side of said tractor in alignment with said front wheels in said seven-gang mower.

References Cited

UNITED STATES PATENTS

| | | | |
|---|---|---|---|
| 1,196,540 | 8/1916 | Graham | 56—7 |
| 1,444,387 | 2/1923 | Reed | 56—7 |
| 2,099,902 | 11/1937 | Moyer et al. | 56—7 |
| 2,659,190 | 11/1953 | Imbt | 56—7 |
| 2,672,000 | 3/1954 | Speiser | 56—7 |
| 3,177,638 | 4/1965 | Johnson | 56—7 |

ABRAHAM G. STONE, *Primary Examiner.*

PASQUALE A. RAZZANO, *Assistant Examiner.*